United States Patent
Zhou

(10) Patent No.: US 10,719,081 B2
(45) Date of Patent: Jul. 21, 2020

(54) AUTOMATIC RETURNING METHOD AND SYSTEM, AND UNMANNED AERIAL VEHICLE

(71) Applicant: AUTEL ROBOTICS CO., LTD., Shenzhen, Guangdong (CN)

(72) Inventor: Shunhui Zhou, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 40 days.

(21) Appl. No.: 16/041,116

(22) Filed: Jul. 20, 2018

(65) Prior Publication Data

US 2018/0348765 A1   Dec. 6, 2018

Related U.S. Application Data

(63) Continuation-in-part of application No. PCT/CN2016/070179, filed on Jan. 5, 2016.

(30) Foreign Application Priority Data

Dec. 10, 2015   (CN) .......................... 2015 1 0916318

(51) Int. Cl.
  *G05D 1/00*  (2006.01)
  *G05D 1/10*  (2006.01)
  (Continued)

(52) U.S. Cl.
  CPC .......... *G05D 1/0088* (2013.01); *B64C 39/024* (2013.01); *G01C 21/08* (2013.01);
  (Continued)

(58) Field of Classification Search
  CPC ........ G01C 17/38; G01C 19/36; G01C 23/00;
    G01C 21/08; G01C 21/165; G01C 21/20;
    G01C 21/00; G01C 21/06; G01C 21/10;
    G01C 21/28; G01C 21/30; G01C 21/34;
    G01C 21/3415; G01W 1/00;
  (Continued)

(56) References Cited

U.S. PATENT DOCUMENTS

| 4,809,007 A | 2/1989 | Hassenplug |
| 6,782,742 B1 * | 8/2004 | Adebjork ............. G05D 1/0077 73/170.01 |

(Continued)

FOREIGN PATENT DOCUMENTS

| CN | 102520728 A | 6/2012 |
| CN | 102901997 A | 1/2013 |
| CN | 104535065 A | 4/2015 |

*Primary Examiner* — Anthony R Jimenez

(57) ABSTRACT

The present invention relates to unmanned aerial vehicles. The method includes: when the magnetometer is invalid or encounters strong magnetic interference, assuming that a track angle is equivalent to the head direction, and accelerating the aircraft in a head direction; determining whether a speed obtained after the aircraft is accelerated reaches a preset value; if the speed reaches the preset value, obtaining the track angle of the aircraft according to the speed; obtaining a current location and a home point of the aircraft by using a positioning system that can provide global or local coordinates, to obtain a heading angle of the aircraft; determining whether a difference between the heading angle of the aircraft and the track angle of the aircraft is less than a fixed value.

14 Claims, 3 Drawing Sheets

(51) Int. Cl.
  *G01C 21/20*  (2006.01)
  *B64C 39/02*  (2006.01)
  *G01C 21/08*  (2006.01)
  *G01C 21/16*  (2006.01)

(52) U.S. Cl.
  CPC ........... *G01C 21/165* (2013.01); *G01C 21/20* (2013.01); *G05D 1/101* (2013.01); *G05D 1/102* (2013.01); *B64C 2201/145* (2013.01)

(58) Field of Classification Search
  CPC ............ B64C 2201/145; B64C 39/024; G05D 1/101; G05D 1/102; G05D 1/0088; G05D 1/00; G05D 1/0212; G05D 1/0276; G05D 1/0808; G05D 1/10; G05D 1/12; G05D 3/00; G01P 3/00; G01P 3/02; G01P 15/00; B60W 30/18181; B60W 2720/00; G08G 5/0039
  USPC ...................................................... 73/170.02
  See application file for complete search history.

(56) References Cited

U.S. PATENT DOCUMENTS

| | | |
|---|---|---|
| 2004/0250616 A1 | 12/2004 | Adebjork et al. |
| 2013/0345972 A1 | 12/2013 | Laskarpour |

\* cited by examiner

AUTOMATIC RETURNING METHOD AND SYSTEM, AND UNMANNED AERIAL VEHICLE

CROSS REFERENCE

The present application is a continuation in part of International Application No. PCT/CN2016/070179, filed on Jan. 5, 2016, which claims priority of Chinese Patent No. 201510916318.9, filed on Dec. 10, 2015, both of which are hereby incorporated by reference in their entireties.

TECHNICAL FIELD

The present invention relates to the field of flight control technologies, and in particular, to a method and a system for controlling an aircraft to automatically return and an unmanned aerial vehicle.

RELATED ART

In the existing field of unmanned aerial vehicles, waypoint flight (for example, by using a multi-rotor aerial photography aircraft) needs to depend on a stable satellite positioning signal and a magnetometer. If the magnetometer is interfered during flight, a user can only fly the aircraft in a manual attitude mode. During flight in this mode, if the user cannot correctly determine a head direction of the aircraft, the user cannot correctly operate the aircraft. In addition, when the magnetometer is invalid, the aircraft cannot perform a safety protection measure or an automatic returning function.

For a multi-rotor aircraft, because the aircraft is designed with no head, if a magnetometer is invalid during flight, it is difficult to determine a head direction and a flight direction of the aircraft.

Now a commonly used solution is loading two Global Navigation Satellite System (GNSS) receivers on an unmanned aerial vehicle, and obtaining a location of the unmanned aerial vehicle through calculation by using an interference method (referring to http://www.vectornav.com/products/vn -300 Dual GPS Compassing Algorithm). However, the weight and production costs of the unmanned aerial vehicle are undoubtedly increased by using the solution.

In addition, a sensor having higher precision may alternatively be used, so that a heading and a location of the unmanned aerial vehicle can be accurately estimated even under magnetic field interference. However, this also increases costs of the unmanned aerial vehicle. Based on a cost factor, the foregoing more expensive sensor solution is not applicable for an aerial photography aircraft.

Moreover, a movement direction of an object may be determined by using a GNSS. For a machine (such as a vehicle or a fixed-wing aircraft) that can only be pushed to move forward, speed information provided by the GNSS may be used to estimate a location of the machine. The movement direction calculated by using the movement direction information is referred to as a track angle. However, for a multi-rotor aircraft, this assumption may not be correct, because the multi-rotor aircraft may fly in a straight line in any direction. Under the premise that a user clearly knows a direction of a head of the aircraft, the user may control the aircraft to fly in any direction such as the front direction, the back direction, the left direction, or the right direction without adjusting the head. Therefore, the speed information of the GNSS can only provide a movement direction of the multi-rotor aircraft. However, the head direction of the aircraft cannot be correctly determined based on the speed information provided by the GNSS.

SUMMARY

The present invention aims to overcome the foregoing problems in the prior art, and provides an automatic returning system and method, to achieve, under the premise that existing hardware is not changed and by using a low-cost Global Navigation Satellite System receiver and a particular flight action designed in the present invention, an effect of estimating a heading of an aircraft and safely and autonomously returning.

To resolve the foregoing technical problem, the present invention provides the following technical solutions:

According to one aspect, the present invention provides an automatic returning system, applied to an aircraft, the aircraft being provided with a magnetometer, where the automatic returning system includes: a determining module, configured to determine whether the magnetometer is invalid or encounters strong magnetic interference; an acceleration module, configured to: when the magnetometer is invalid or encounters strong magnetic interference, accelerate the aircraft in a head direction, where it is assumed that the head direction is equivalent to a track angle, the determining module being further configured to determine whether a speed obtained after the aircraft is accelerated reaches a preset value; a processing module, configured to: when the speed reaches the preset value, obtain the track angle of the aircraft according to the speed, where the processing module is further configured to obtain a current location and a home point of the aircraft by using a positioning system that can provide global or local coordinates, to obtain a heading angle of the aircraft; and the determining module is further configured to determine whether a difference between the heading angle of the aircraft and the track angle of the aircraft is less than a fixed value; and a control module, configured to: when the difference is less than the fixed value, control the aircraft to directly return.

According to another aspect, the present invention provides an aircraft automatic returning method, an aircraft being provided with a magnetometer, where the method includes: when the magnetometer is invalid or encounters strong magnetic interference, assuming that a track angle is equivalent to the head direction and accelerating the aircraft in a head direction; determining whether a speed obtained after the aircraft is accelerated reaches a preset value; if the speed reaches the preset value, obtaining the track angle of the aircraft according to the speed; obtaining a current location and a home point of the aircraft by using a positioning system that can provide global or local coordinates, to obtain a heading angle of the aircraft; determining whether a difference between the heading angle of the aircraft and the track angle of the aircraft is less than a fixed value; and if the difference is less than the fixed value, controlling the aircraft to directly return.

The present invention further provides an unmanned aerial vehicle, including the foregoing automatic returning system.

The present invention further provides a fixed-wing unmanned aerial vehicle, including the foregoing automatic returning system.

Compared with the prior art, beneficial effects of the present invention are: When the magnetometer on the aircraft is invalid or encounters strong magnetic interference, the head direction of the aircraft is determined by using the GNSS receiver, to determine the heading and a location of the home point of the aircraft, thereby implementing safety returning of the aircraft without increasing hardware costs of the aircraft.

DETAILED DESCRIPTION

To make the objectives, technical solutions, and advantages of the present invention clearer and more comprehensible, the present invention is described in further detail with reference to the accompanying drawings and the embodiments. It should be understood that the specific embodiments described herein are merely used for explaining the present invention, and are not intended to limit the present invention.

Figure 1:
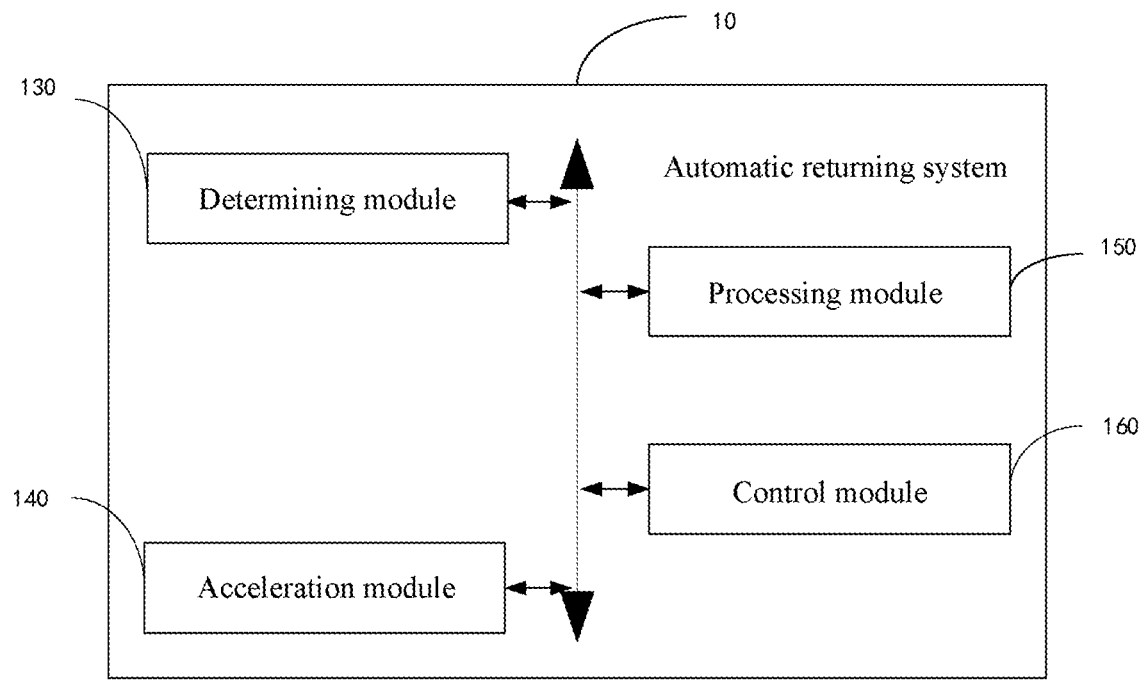
FIG. 1 is a schematic diagram of functional modules of an automatic returning system according to an embodiment of the present invention.

Referring to FIG. 1, FIG. 1 is a schematic diagram of functional modules of an automatic returning system 10 according to an embodiment of the present invention.

In this embodiment, the automatic returning system 10 is applied to an aircraft. The aircraft is provided with a magnetometer and a positioning system that can provide global or local coordinates. The magnetometer is configured to receive magnetic induction strength. The positioning system that can provide global or local coordinates is configured to obtain a location of the aircraft and an east-west direction speed (VEL_E) and a south-north direction speed (VEL_N) of the unmanned aerial vehicle during flight.

In this embodiment, the positioning system includes any of a Global Navigation Satellite System, a Differential Global Positioning System, a real-time dynamic Global Positioning System, a radio frequency identification-based local positioning system, and an ultra-wideband positioning system.

In this embodiment, the aircraft may be a fixed-wing unmanned aerial vehicle, an unmanned helicopter or a multi-rotor aircraft.

In this embodiment, the automatic returning system includes a determining module 130, an acceleration module 140, a processing module 150 and a control module 160.

In this embodiment, the determining module 130 is configured to determine whether the magnetometer is invalid or encounters strong magnetic interference. In this embodiment, the determining module 130 determines, by determining whether the magnetic induction strength received by the magnetometer is abnormal, whether the magnetometer is invalid or encounters strong magnetic interference.

In this embodiment, the acceleration module 140 is configured to: when the magnetometer is invalid or encounters strong magnetic interference, accelerate the aircraft in a head direction. It is assumed that the head direction is equivalent to a track angle. The determining module 130 is further configured to determine whether a speed obtained after the aircraft is accelerated reaches a preset value. In this embodiment, the acceleration module 140 is a motor on the aircraft. Different outputs of motors indicate different speeds.

In this embodiment, the acceleration module 140 is further configured to: when the speed does not reach the preset value, continue to accelerate the aircraft.

In this embodiment, when accelerating the aircraft, the acceleration module 140 needs to maintain left and right inclination angles of the aircraft as zero.

In this embodiment, the processing module 150 is configured to: when the speed reaches the preset value, obtain the track angle of the aircraft according to the speed. The processing module 150 is further configured to obtain a current location and a home point of the aircraft by using the positioning system that can provide global or local coordinates, to obtain a heading angle of the aircraft. In this embodiment, an algorithm used by the processing module 150 for obtaining the track angle of the aircraft is:

$$\psi_{gnss} = a\tan 2(VEL\_E, VEL\_N),$$

where VEL_E is an east-west direction speed provided by a GNSS receiver, and VEL_N is a south-north direction speed provided by the GNSS receiver.

In this embodiment, the positioning system is configured to obtain the current location and the home point of the aircraft, to obtain the heading angle of the aircraft. The determining module 130 is further configured to determine whether a difference between the heading angle and the track angle is less than a fixed value. In this embodiment, the difference is an angle of the head direction of the aircraft that needs to be adjusted. The fixed value may be 10 degrees, 15 degrees, 20 degrees, or the like.

Figure 2:
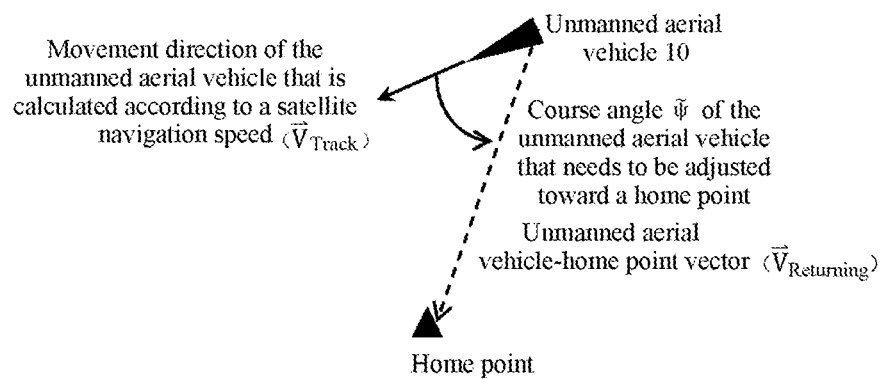
FIG. 2 is a schematic diagram of an angle of a head direction that needs to be adjusted according to an embodiment of the present invention.

Referring to FIG. 2, FIG. 2 is a schematic diagram of an angle of a head direction that needs to be adjusted. Because the aircraft records coordinates of the home point and the positioning system provides current coordinates in which the aircraft is located. A vector ($\vec{V}_{Returning}$) is formed between the two points. In addition, the track angle calculated by the processing module 150 also forms a vector ($\vec{V}_{Track}$). An angle between the two vectors (that is, the foregoing difference) is the head direction (that is, a heading) of the aircraft that needs to be adjusted, to implement precise returning.

The heading angle of the aircraft that needs to be adjusted toward the home point is $\tilde{\psi}$:

$$\tilde{\psi} = \left( \frac{\vec{V}_{Returning} \cdot \vec{V}_{Track}}{\|\vec{V}_{Returning}\| \|\vec{V}_{Track}\|} \right)$$

The control module 160 is configured to: when the difference is less than the fixed value, control the aircraft to directly return.

The control module 160 is further configured to: when the difference is not less than the fixed value, adjust the head direction (that is, the heading) of the aircraft. In this embodiment, a method of adjusting the track angle of the aircraft by the control module 160 is: controlling the acceleration module 140 to accelerate the aircraft, and adjusting the east-west direction speed VEL_E and the south-north direction speed VEL_N, thereby adjusting the heading of the unmanned aerial vehicle.

In this embodiment, when the magnetometer cannot normally work because of external electromagnet interference or when the magnetometer is invalid, safety returning of the aircraft can be ensured. In addition, no additional hardware is required and costs are low.

Figure 3:
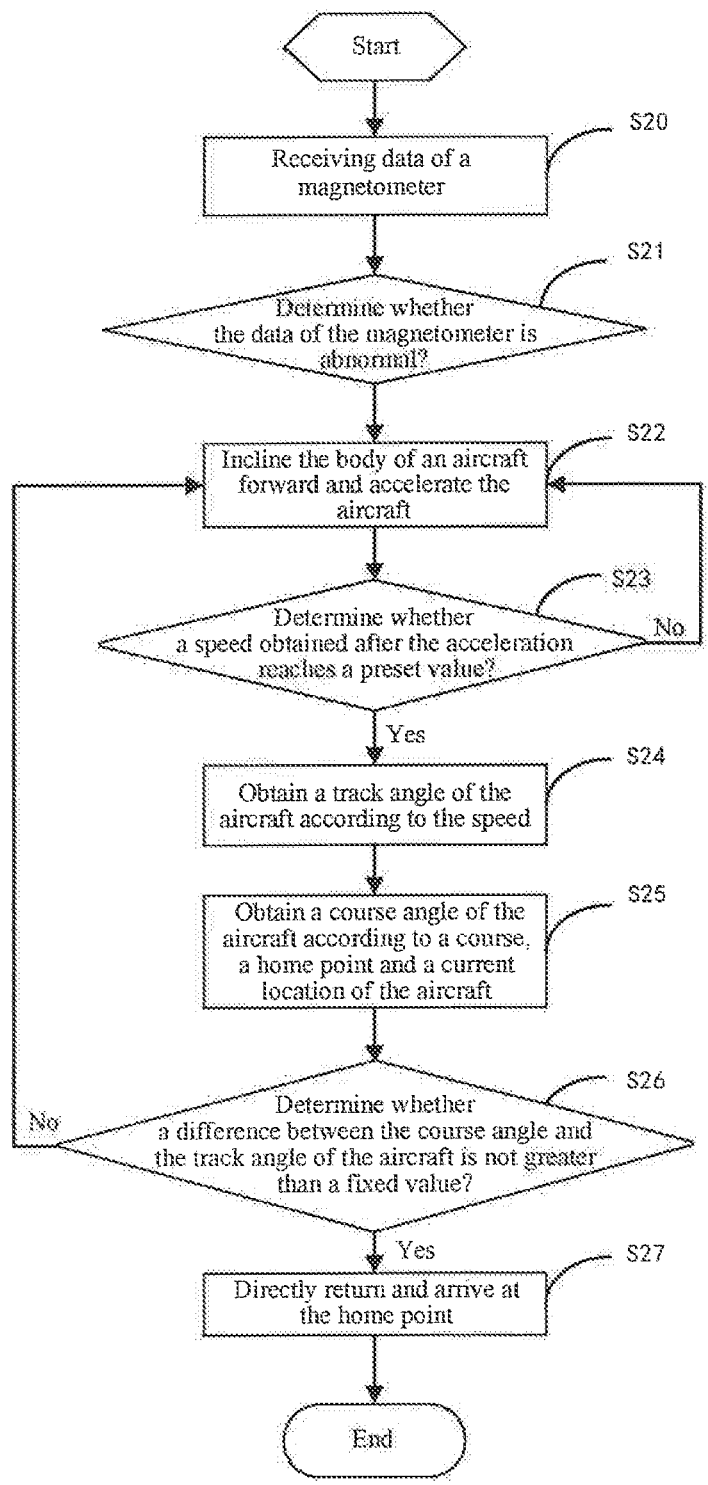
FIG. 3 is a flowchart of automatic returning according to an embodiment of the present invention.

Referring to FIG. 3, FIG. 3 is a flowchart of controlling an aircraft to automatically return according to an embodiment of the present invention.

In this embodiment, an aircraft is provided with a magnetometer and a positioning system. The positioning system is configured to obtain a location in which the aircraft is located and an east-west direction speed (VEL_E) and a south-north direction speed (VEL_N) of the aircraft during flight.

In this embodiment, the positioning system includes any of a Global Navigation Satellite System, a Differential Global Positioning System, a real-time Global Positioning System, a radio frequency identification-based local positioning system, and an ultra-wideband positioning system.

In this embodiment, the aircraft further includes a determining module 130, an acceleration module 140, a processing module 150 and a control module 160.

In this embodiment, the method includes the following steps:

Step S20: The magnetometer receives magnetic induction strength.

Step S21: The determining module 130 determines whether the magnetic induction strength in step S20 is abnormal.

If the magnetic induction strength is abnormal, it indicates that the magnetometer is invalid or encounter strong magnetic interference. In step S22, the acceleration module 140 accelerates the aircraft. In this embodiment, when accelerating the aircraft, the acceleration module 140 needs to maintain left and right inclination angles of the aircraft as zero.

Step S23: The determining module 130 determines whether a speed obtained after the aircraft is accelerated reaches a preset value.

If the speed reaches the preset value, in step S24, the processing module 150 obtains a track angle of the aircraft according to the speed. In this embodiment, an algorithm used by the processing module 150 for obtaining the track angle of the aircraft is:

$\psi gnss = a\tan 2(VEL\_E, VEL\_N)$, where VEL_E is an east-west direction speed provided by a GNSS receiver, and VEL_N is a south-north direction speed provided by the GNSS receiver. Actually, due to some uncontrollable factors such as natural wind and imbalance of the aircraft, ψgnss and the head direction deviate in fact.

Step S25: The processing module 150 obtains a current location and a home point of the aircraft by using the positioning system, to obtain a heading angle of the aircraft.

Step S26: The determining module 130 determines whether a difference between the heading angle and the track angle is less than a fixed value. In this embodiment, the difference is an angle of the head direction of the aircraft that needs to be adjusted. The fixed value may be 10 degrees, 15 degrees, 20 degrees, or the like.

Referring to FIG. 2, because the aircraft records coordinates of the home point and the GNSS receiver provides current coordinates in which the aircraft is located. A vector ($\vec{V}_{Returning}$) is formed between the two points. In addition, the track angle calculated by the processing module 150 also forms a vector ($\vec{V}_{Track}$). An angle between the two vectors (that is, the foregoing difference) is a heading of the aircraft that needs to be adjusted, to implement precise returning.

The heading angle of the aircraft that needs to be adjusted toward the home point is $\tilde{\psi}$:

$$\tilde{\psi} = a\cos\left(\frac{\vec{V}_{Returning} \cdot \vec{V}_{Track}}{\|\vec{V}_{Returning}\|\|\vec{V}_{Track}\|}\right)$$

If the difference is less than the fixed value, in step S27, the control module 160 controls the aircraft to directly return.

If the speed does not reach the preset value, step S22 is returned, so that the acceleration module 140 continues to accelerate the aircraft.

If the difference is not less than the fixed value, step S22 is returned, to adjust the heading of the aircraft. In this embodiment, a method of adjusting the track angle of the aircraft by the control module 160 is controlling the acceleration module 140 to accelerate the aircraft, and adjusting the east-west direction speed VEL_E and the south-north direction speed VEL_N, thereby adjusting the heading of the aircraft.

The present invention further provides an unmanned aerial vehicle, including the foregoing automatic returning system. When a magnetometer on the unmanned aerial vehicle experiences external electromagnetic interference or the magnetometer is invalid, the unmanned aerial vehicle returns by using the foregoing automatic returning method.

Figure 4:
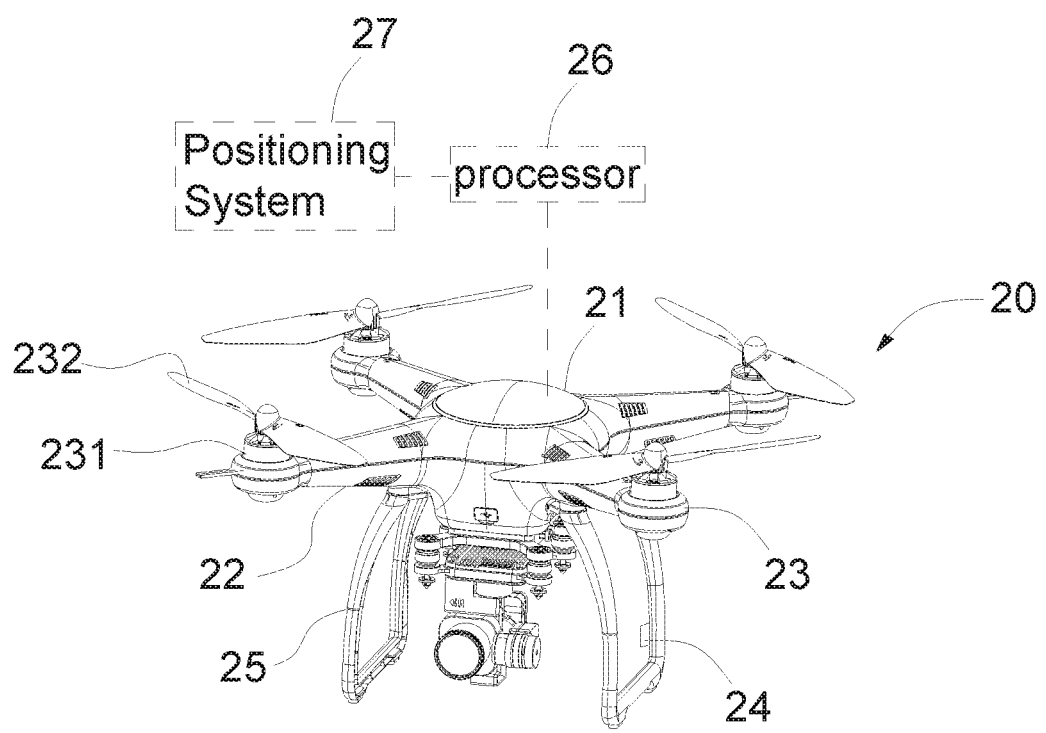
FIG. 4 is a schematic diagram of an unmanned aerial vehicle according to an embodiment of the present invention.

Referring to FIG. 4, the present invention further provides an unmanned aerial vehicle 20 and the unmanned aerial vehicle 20 comprises a vehicle body 21, a magnetometer 24 coupled to the vehicle body 21, four arms 22 coupled to the vehicle body 21, an actuating apparatus 23 disposed on the arm 22, a processor 26 and a positioning system 27 couple to the vehicle body 21.

The vehicle body 21 usually has a landing gear 25 and the magnetometer 24 may be coupled to the landing gear 25 to avoid electromagnetic interference. The actuating apparatus 23 is disposed on one end of the arm 22 and comprises a motor 231 and a propeller 232. The propeller 232 is driven by the motor 231 to generate a lifting force. In this embodiment, the unmanned aerial vehicle 20 is a multi-rotor unmanned aerial vehicle which has four propellers 232. In other possible embodiment, the unmanned aerial vehicle may be a fix-wing unmanned aerial vehicle. The processor 26 may also be disposed in the vehicle body 21 or the arm 22 and used to perform the foregoing method. The positioning system 27 includes any of a Global Navigation Satellite System, a Differential Global Positioning System, a real-time Global Positioning System, a radio frequency identification-based local positioning system, and an ultra-wideband positioning system. The positioning system 27 is capable of provide global or local coordinates and is coupled to the processor 26.

In one embodiment of the present invention, the processor 26 is configured to:

determine a magnetic induction strength is abnormal;

accelerate the unmanned aerial vehicle 20 in a head direction, assuming that a track angle is equivalent to the head direction;

determine whether a speed obtained after the unmanned aerial vehicle 20 is accelerated reaches a preset value;

if the speed reaches the preset value, obtain the track angle of the unmanned aerial vehicle 20 according to the speed;

obtain a current location and a home point of the unmanned aerial vehicle 20 provided by the positioning system 27, to obtain a heading angle of the unmanned aerial vehicle 20;

determine whether a difference between the heading angle of the unmanned aerial vehicle 20 and the track angle of the unmanned aerial vehicle 20 is less than a fixed value; and if the difference is less than the fixed value, controlling the unmanned aerial vehicle 20 to directly return.

In one embodiment of the present invention, the track angle of the unmanned aerial vehicle 20 is:

$$\psi \text{gnss} = a\tan 2(\text{VEL\_E}, \text{VEL\_N}),$$

where VEL_E being an east-west direction speed provided by the positioning system 27, and VEL_N being a south-north direction speed provided by the positioning system 27.

In one embodiment of the present invention, the processor 26 is further configured to:

maintain left and right inclination angles of the unmanned aerial vehicle 20 as zero.

In one embodiment of the present invention, the processor 26 is further configured to:

if the difference is not less than the fixed value, accelerate the unmanned aerial vehicle 20 in the head direction and adjust the head direction of the unmanned aerial vehicle 20.

In one embodiment of the present invention, the processor 26 is further configured to:

obtain an east-west direction speed and a south-north direction speed provided by the positioning system 27;

adjust the east-west direction speed and the south-north direction speed to adjust the head direction of the unmanned aerial vehicle 20.

In one embodiment of the present invention, the processor 26 is further configured to:

if the speed doesn't reach the preset value, continually accelerate the unmanned aerial vehicle 20 in the head direction.

In one embodiment of the present invention, the processor 26 is further configured to:

control the magnetometer 24 to receive the magnetic induction strength.

The detailed description of this embodiment can be referred to the embodiment of aircraft automatic returning method, which won't be repeated here.

According to the automatic returning system and method, and the unmanned aerial vehicle in the present invention, when external electromagnetic interference affects normal working of the magnetometer or the magnetometer is invalid, the location of the home point is obtained by using the GNSS receiver and the aircraft is accelerated by using the acceleration module, to obtain the track angle of the aircraft, and the heading of the aircraft is adjusted in time to implement safety returning of the aircraft, so that a safety returning problem of the unmanned aerial vehicle is effectively resolved without adding hardware. Therefore, costs are low.

It should be noted that in a specific embodiment of the present invention, another positioning system that can provide global or local coordinates, such as a radio frequency identification (RFID)-based local positioning system or an ultra-wideband positioning system, may further be adopted.

The foregoing descriptions are merely preferred embodiments of the present invention, but are not intended to limit the present invention. Any modification, equivalent replacement, or improvement made within the spirit and principle of the present invention shall fall within the scope of the present invention.

What is claimed is:

1. An aircraft automatic returning method, the aircraft being provided with a magnetometer, wherein the method comprises:

determining a magnetic induction strength is abnormal;

accelerating the aircraft in a head direction, when a track angle is equivalent to the head direction;

determining whether a speed obtained after the aircraft is accelerated reaches a preset value;

when the speed reaches the preset value, obtaining the track angle of the aircraft according to the speed;

obtaining a current location and a home point of the aircraft by using a positioning system that provides global or local coordinates, to obtain a heading angle of the aircraft;

determining whether a difference between the heading angle of the aircraft and the track angle of the aircraft is less than a fixed value; and when the difference is less than the fixed value, controlling the aircraft to return.

2. The method according to claim 1, wherein the track angle of the aircraft is:

$$\psi \text{gnss} = a\tan 2(\text{VEL\_E}, \text{VEL\_N}),$$

VEL_E being an east-west direction speed provided by the positioning system, and VEL_N being a south-north direction speed provided by the positioning system.

3. The method according to claim 1, wherein the accelerating the aircraft in the head direction comprises:

maintaining left and right inclination angles of the aircraft as zero.

4. The method according to claim 1 further comprising:

when the speed does not reach the preset value, continually accelerating the aircraft in the head direction.

5. The method according to claim 1 further comprising:

receiving the magnetic induction strength by the magnetometer.

6. The method according to claim 1 further comprising:

when the difference is not less than the fixed value, accelerating the aircraft in the head direction and adjusting the head direction of the aircraft.

7. The method according to claim 6, wherein the adjusting the head direction of the aircraft comprising:

obtaining an east-west direction speed and a south-north direction speed provided by the positioning system;

adjusting the east-west direction speed and the south-north direction speed to adjust the head direction of the aircraft.

8. An unmanned aerial vehicle, comprising:

a vehicle body;

a magnetometer, coupled to the vehicle body;

an arm, coupled to the vehicle body;

an actuating apparatus, disposed on the arm;

a processor, coupled to the vehicle body; and a positioning system, the positioning system being capable to provide global or local coordinates and coupled to the processor; wherein the processor is configured to:

determine when a magnetic induction strength is abnormal;

accelerate the unmanned aerial vehicle in a head direction, when a track angle is equivalent to the head direction;

determine whether a speed obtained after the unmanned aerial vehicle is accelerated reaches a preset value;

when the speed reaches the preset value, obtain the track angle of the unmanned aerial vehicle according to the speed;

obtain a current location and a home point of the unmanned aerial vehicle provided by the positioning system, to obtain a heading angle of the unmanned aerial vehicle;

determine whether a difference between the heading angle of the unmanned aerial vehicle and the track angle of the unmanned aerial vehicle is less than a fixed value; and when the difference is less than the fixed value, controlling the unmanned aerial vehicle to return.

9. The unmanned aerial vehicle according to claim 8, wherein the track angle of the unmanned aerial vehicle is:

$\psi gnss = a\tan2(VEL\_E, VEL\_N)$,

VEL_E being an east-west direction speed provided by the positioning system, and VEL_N being a south-north direction speed provided by the positioning system.

10. The unmanned aerial vehicle according to claim 8, wherein the processor is further configured to:
maintain left and right inclination angles of the unmanned aerial vehicle as zero.

11. The unmanned aerial vehicle according to claim 8, wherein the processor is further configured to:
when the speed doesn't reach the preset value, continually accelerate the unmanned aerial vehicle in the head direction.

12. The unmanned aerial vehicle according to claim 8, wherein the processor is further configured to:
control the magnetometer to receive the magnetic induction strength.

13. The unmanned aerial vehicle according to claim 8, wherein the processor is further configured to:
when the difference is not less than the fixed value, accelerate the unmanned aerial vehicle in the head direction and adjust the head direction of the unmanned aerial vehicle.

14. The unmanned aerial vehicle according to claim 13, wherein the processor is further configured to:
obtain an east-west direction speed and a south-north direction speed provided by the positioning system;
adjust the east-west direction speed and the south-north direction speed to adjust the head direction of the unmanned aerial vehicle.

* * * * *